Nov. 13, 1951  J. D. LEITCH ET AL  2,575,021
DYNAMIC BRAKING OF A SINGLE
DIRECT CURRENT SERIES MOTOR
Filed March 21, 1947  3 Sheets-Sheet 1
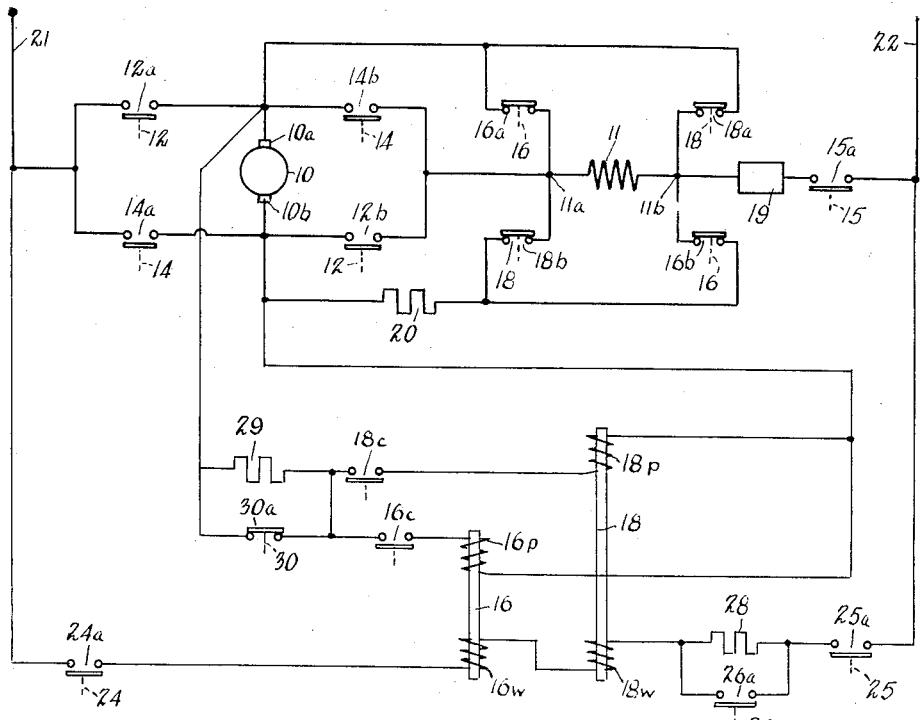
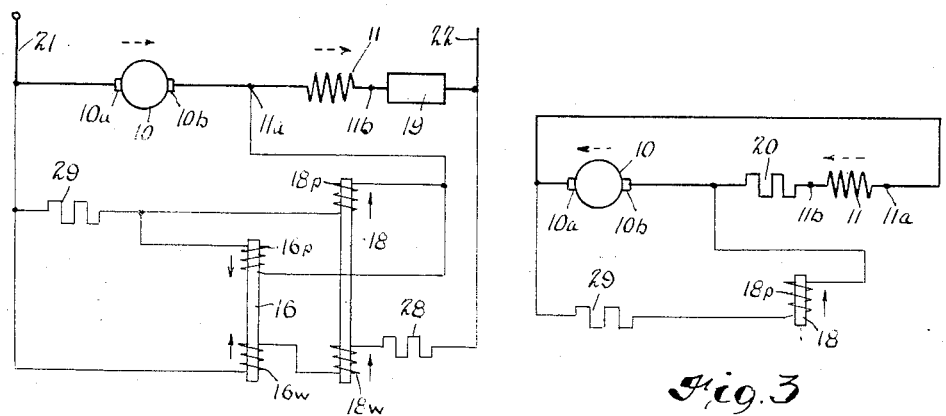
INVENTORS
JOHN D. LEITCH AND
PAUL G. WHITE
BY
Oberlin & Limbach
ATTORNEYS.

Nov. 13, 1951    J. D. LEITCH ET AL    2,575,021
DYNAMIC BRAKING OF A SINGLE
DIRECT CURRENT SERIES MOTOR
Filed March 21, 1947    3 Sheets-Sheet 2

INVENTORS
JOHN D. LEITCH AND
PAUL G. WHITE
BY
Oberlin & Limbach
ATTORNEYS.

Nov. 13, 1951  J. D. LEITCH ET AL  2,575,021
DYNAMIC BRAKING OF A SINGLE
DIRECT CURRENT SERIES MOTOR
Filed March 21, 1947  3 Sheets-Sheet 3

INVENTORS
JOHN D. LEITCH AND
BY PAUL G. WHITE

Oberlin & Limbach
ATTORNEYS.

Patented Nov. 13, 1951

2,575,021

UNITED STATES PATENT OFFICE 2,575,021

DYNAMIC BRAKING OF A SINGLE DIRECT-CURRENT SERIES MOTOR

John D. Leitch, Shaker Heights, and Paul G. White, Cleveland, Ohio, assignors to The Electric Controller & Mfg. Co., Cleveland, Ohio, a corporation of Ohio Application March 21, 1947, Serial No. 736,146

20 Claims. (Cl. 318—368)

This invention relates to a control system for a direct current motor, and more particularly to a control system which connects the armature winding and the series field winding of a reversible motor automatically in the proper relationship in a loop circuit for dynamic braking regardless of the direction of the motor rotation and which also reduces automatically the resistance of the loop circuit as the motor decelerates.

A switching means of the reversing type is often used to complete selectively dynamic braking loops for a reversible series motor in order that the current in the armature winding but not in the field winding reverses when braking operation is desired. This selective current reversal insures that braking torque is obtained regardless of the direction of motor rotation. For many applications it is desirable that the braking switching means comprise a pair of forward braking contacts and a pair of reverse braking contacts all normally biased to their closed positions. During normal running of the motor all of the braking contacts are held open against their bias. When braking is desired, either by choice of the operator or for other reasons, the motor is disconnected from the source and a selected pair of the braking contacts is permitted to close. Which pair of the braking contacts is selected for closure depends upon the direction of motor rotation.

For automatic operation it is desirable that the braking switching means be responsive to the actual direction of rotation of the motor in order to avoid closure of the incorrect pair of braking contacts under all operating conditions. Previous known systems using mechanical directionally responsive switches or counter-E. M. F. relays for controlling the braking switching means by means of mechanical interlocks have not been completely satisfactory. Mechanical directionally responsive switches associated with the motor shaft are difficult to install and maintain and the counter-E. M. F. relays and their associated circuits when used to control the operation of the braking switching means are subject to the possibility of failure. The mechanical interlocks are also subject to failure and are inherently complicated and difficult to adjust properly.

For controlling the dynamic braking action as the motor decelerates, it is desirable that means be provided to reduce the resistance of the dynamic braking loop at least once during the stopping operation. It is also desirable that the operator be able to select relatively strong or relatively weak braking under normal operating conditions and that only relatively strong braking be obtained upon failure of power.

It is an object of this invention to provide an improved control system for dynamically braking a direct current motor.

Another object is to provide a control system for dynamically braking a reversible series motor which control system does not have the foregoing disadvantages.

Other objects are to provide a dynamic braking control system in which the switching means for completing the dynamic braking circuits is controlled in an improved manner by the counter-E. M. F. of the motor; to provide a dynamic braking control system in which normally closed contactors for completing the dynamic braking circuits are selectively controlled directly by the counter-E. M. F. of the motor; to provide a dynamic braking control system in which the pair of a group of four contacts which is to close to complete a dynamic braking loop is selected by means of the directional relationship of fluxes in the magnetic circuit of the contact operating means prior to braking; to provide an improved dynamic braking control system for braking a series motor automatically upon failure of power from either direction of rotation; and to provide improved means for graduating automatically the dynamic braking action of a direct current motor.

In accordance with this invention, a forward pair and a reverse pair of normally closed dynamic braking contacts are held open magnetically during normal running operation of the motor by respective fluxes produced by windings energized from the supply source for the motor. If the motor is operating in the forward direction, the magnetic flux holding open the reverse pair of braking contacts is augmented by a magnetic flux produced by a winding energized by the voltage drop across the motor armature, and the magnetic flux holding open the forward braking contacts is opposed by and consequently reduced by a magnetic flux produced by a winding also energized by the voltage drop across the motor. Upon failure of power or action of the operator, the motor armature is disconnected from the source and the magnetic fluxes of the windings energized from the supply source and normally tending to hold all of the braking contacts open are reduced to zero. Thereupon, the forward pair of braking contacts closes since the resultant flux holding that pair of contacts open must reduce to zero before it can reverse direction. When the motor armature is disconnected from the power source, the voltage drop across the armature does not reach zero but remains at an appreciable value due to the residual magnetism of the motor field. When the dynamic braking circuit is completed, the field strength is again increased and the voltage drop across the armature likewise increases. The reverse pair of braking contacts, therefore, is held open so long as the motor continues to rotate due to the action of the flux produced by the winding associated with those contacts and energized by the voltage drop across the armature. Since the direction of the voltage drop across the armature depends upon the direction of motor rotation, the assisting and opposing action of the magnetic fluxes is reversed with respect to the two pairs of contacts from that just described if the motor is operating in a reverse direction.

Two separate portions of the dynamic braking resistor are arranged to be by-passed by two normally closed contacts respectively, which, during operation of the motor, are held open magnetically. Braking may be effected by action of the operator with both resistance shunting contacts open substantially throughout the braking cycle or with the contacts closing in delayed sequence during braking as desired. The motor speed at which the second contact closes is selected by controlling the resistance of the energizing circuit of the winding operating the second contact. Upon failure of power one of the resistance shunting contacts closes, but the other resistance shunting contact is held open by the voltage drop across the armature until a predetermined reduced motor speed is reached. That one of the resistance shunting contacts is definitely open at the start of braking insures that adequate braking resistance is effective in the braking loop at the time when the counter-E. M. F. is highest and permits the resistance value of the portion of the dynamic braking resistor not by-passed by the contacts to be chosen without regard to the pick-up value of devices responsive to the braking current.

Other objects and advantages will become apparent from the following description of the invention wherein reference is made to the drawings, in which:

Fig. 1 is a wiring diagram showing the directional braking control;

Figs. 2 and 3 are wiring diagrams showing connections for forward running and braking after forward running, respectively;

Figure 5:
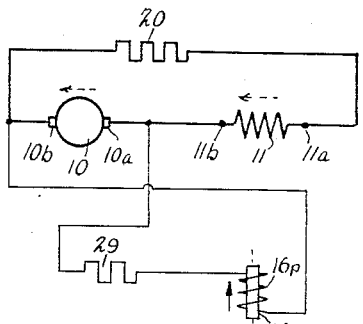
Figure 6:
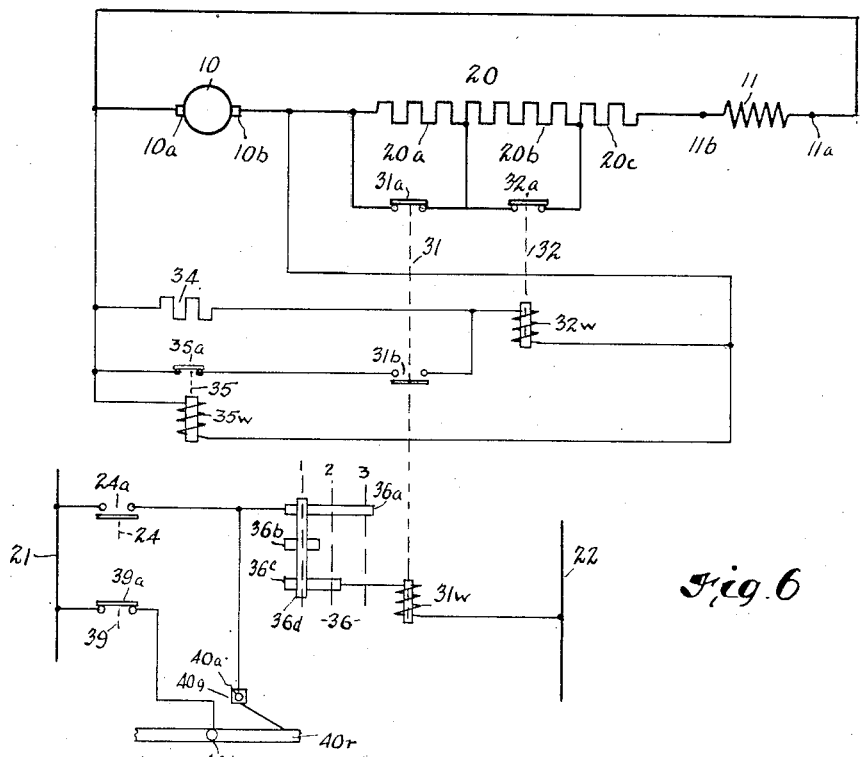
Fig. 6 is a wiring diagram showing control for graduating the braking torque.
Figure 7:
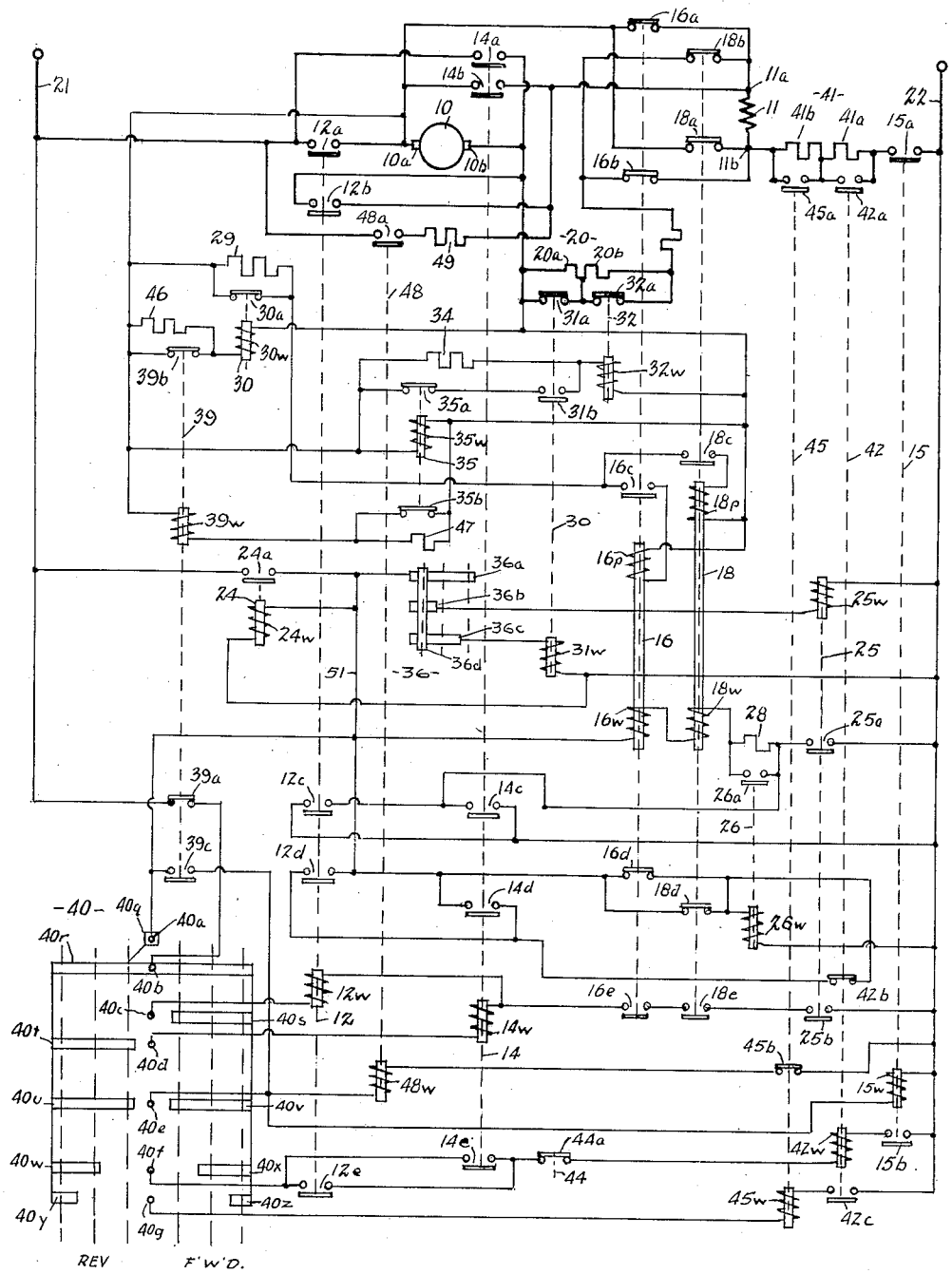
Fig. 7 is a wiring diagram of a complete motor controller.

Many of the contactors and relays are shown incompletely in Figs. 1 to 6, but all of the contactors and relays are shown completely in Fig. 7.

Referring to the drawings, a directionally-responsive, graduated dynamic braking control system in accordance with this invention is shown for a series motor having an armature winding 10 and a series field winding 11. The opposing terminals of the armature are indicated at 10a and 10b, and the opposing terminals of the field winding are indicated at 11a and 11b. The portion of the system shown in Fig. 1 includes a pair of forward running contacts 12a and 12b, a pair of reverse running contacts 14a and 14b, a negative line contact 15a, a pair of forward braking contacts 16a and 16b, a pair of reverse braking contacts 18a and 18b, a suitable acceleration, plugging, and speed control means 19 to be later described, and a dynamic braking resistor 20. The contacts 12a, 12b, 14a, 14b, and 15a may be operated in any suitable manner, but preferably are electromagnetically operated. As hereinafter described with reference to Fig. 7, the contacts 12a and 12b are normally open contacts of an electromagnetic contactor 12, the contacts 14a and 14b are normally open contacts of an electromagnetic contactor 14, and the contact 15a is a normally open contact of an electromagnetic contactor 15.

The contacts 16a and 16b are normally biased to their closed positions illustrated in Fig. 1 as by a spring (not shown) or gravity, and are main contacts of an electromagnetic forward braking contactor 16 having an operating winding 16w, a polarizing winding 16p, and a normally open control circuit contact 16c. Likewise, the contacts 18a and 18b are normally biased to their closed positions and are main contacts of an electromagnetic reverse braking contactor 18 having an operating winding 18w, a polarizing winding 18p, and a normally open control circuit contact 18c. Preferably the windings 16w, 16p, 18w and 18p are intermittent duty windings.

Figure 4:
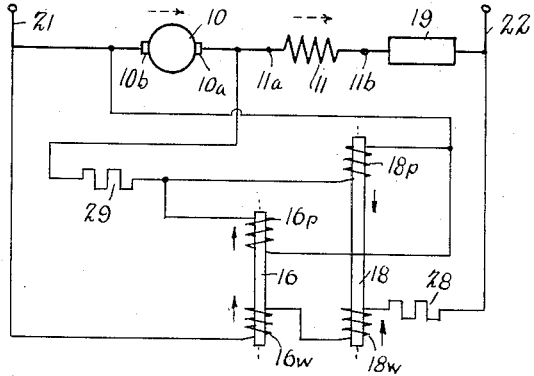
Figs. 4 and 5 are wiring diagram showing connections for reverse running and braking after reverse running, respectively.

Before the motor is connected for operation to a source of direct current represented by the supply conductors 21 and 22, the contacts 16a, 16b, 18a and 18b are moved to their open positions as a result of the energization of the windings 16w and 18w. As shown in Fig. 1, the windings 16w and 18w are connected in series with each other across the supply conductors 21 and 22 upon closure of suitable control means, such as normally open contacts 24a and 25a of a low voltage protection relay 24 and a braking control relay 25, respectively; and the energization of these windings may be increased temporarily when desired by momentary closure of a time delay opening contact 26a of a relay 26 which contact when closed by-passes a protective resistor 28 in series with the windings 16w and 18w. With the contacts 16a, 16b, 18a, and 18b open, the contacts 12a, 12b, and 15a may be closed to connect the motor for forward running operation as indicated in Fig. 2, or the contacts 14a, 14b, and 15a may be closed to connect the motor for reverse running operation as indicated in Fig. 4. It is apparent from Figs. 1, 2 and 4 that the direction of magnetization of the armature winding 10 is reversed while the direction of magnetization of the field winding 11 remains the same in order to control selectively the direction of operation of the motor.

The polarizing winding 16p is arranged to be connected through the contacts 16c and the polarizing winding 18p is arranged to be connected through the contacts 18c in parallel with each other across the armature winding 10. A resistor 29 is preferably connected in series with the windings 16p and 18p and is normally by-passed by a contact 30a of a relay 30 responsive to the counter-E. M. F. of the motor. Thus, after the windings 16w and 18w are energized to move the respective contactors 16 and 18 to their picked-up positions, the motor can be started and the windings 16p and 18p become energized due to the voltage drop across the armature winding 10. Since the resistor 29 is by-passed by the contact 30a at low speeds of the motor, the windings 16p and 18p are strongly energized during initial acceleration even though the drop across the armature 10 is low. The relay 30 responds to open its contact 30a as soon as the motor accelerates to a predetermined speed, and the protective resistor 29 thereby is effectively connected in series with the windings 16p and 18p. Preferably the drop-out flux value of the contactors 16 and 18 is made as low as possible.

When the motor is operating in the forward direction, the direction of current through the armature 10 is from the terminal 10a to the terminal 10b and the direction of current through the field winding 11 is from the terminal 11a to the terminal 11b as indicated by the dotted arrows in Fig. 2. The direction of current through the windings 16w, 16p, 18w, and 18p for forward operation is as shown by the solid arrows in Fig. 2 which solid arrows also indicate the direction of the flux produced by the respective windings. During forward operation of the motor, the windings 18w and 18p assist each other in holding the reverse braking contactor 18 in its picked-up position, and the windings 16w and 16p oppose each other. The flux of the winding 16w is maintained greater than that of the winding 16p so that the algebraic sum of the opposing fluxes is an excess flux. The windings are so related that the excess flux normally is above the drop-out flux of the contactor 16. Thus the excess flux is sufficient to hold the contactor 16 in its picked-up position.

Upon failure of power or other reason causing one or the other or both of the contacts 24a or 25a to move to their open positions, the contacts 12a and 12b also open and the windings 16w and 18w become deenergized. As mentioned above, for forward operation, the contacts 16a and 16b are held in their open positions because of the excess of flux, above the drop-out value, produced by the winding 16w over that produced by the winding 16p. Although the winding 16p remains energized in the same direction for an instant after opening of the contacts 12a and 12b due to the residual counter-E. M. F. of the armature 10, the loss of the flux produced by the opposing winding 16w causes the total flux in the contactor 16 to reach zero. At this instant, the contactor 16 drops out and opens its contacts 16c to prevent further energization of the winding 16p. Drop-out of the contactor 16 also closes the contacts 16a and 16b to complete the dynamic braking circuit of Fig. 3. During the short interval from the instant power is removed from the armature 10 until the dynamic braking circuit is established, the winding 18p is energized by the low counter voltage obtained from the residual magnetism in the motor field, and the contactor 18 does not drop out. Since the resistor 29 is effectively in series with both windings 16p and 18p during normal running, opening of the contact 16c causes an increase in the voltage across the winding 18p further insuring that the contactor 18 remains in its picked-up position. The direction of the flux of the contactor 18 is not altered and its magnitude is maintained above the drop-out value of the contactor 18 until a very low speed is reached. The contact 30a preferably closes at a predetermined reduced speed of the motor to short circuit the resistor 29 thereby to cause the voltage across the winding 18p substantially to equal the counter-voltage of the motor during the latter stage of the braking cycle.

As shown by the arrows in Fig. 3, the counter-E. M. F. after forward running causes a dynamic braking current to flow from terminal 10a of the armature 10 through the field winding 11 from the terminal 11a to the terminal 11b and through the resistor 20 to the armature terminal 10b. The direction of current flow through the armature 10 has reversed but the current in the field winding 11 has remained in the same direction and the motor is brought to rest or to a very slow speed by dynamic braking torque.

When the motor is connected to the supply lines for operation in the reverse direction by closure of the contacts 14a, 14b, and 15a, the direction of current flow through the armature 10 is from the terminal 10b to the terminal 10a which is opposite from the direction during forward operation, but the direction of the field current in each instance is the same as shown by comparison of Figs. 2 and 4. The solid arrows of Fig. 4 show that during reverse operation the windings 16w and 16p assist each other in holding the contacts 16a and 16b open, whereas the windings 18w and 18p now oppose each other so as to provide an operating excess flux in the same manner as is provided by the windings 16p and 16w when the motor is operating in the forward direction. The contacts 18a and 18b remain in their open positions because of the excess flux produced by the winding 18w.

When the motor is rotating in the reverse direction and the contacts 24a or 25a or both open, the contacts 14a and 14b also open, and the windings 16w and 18w become deenergized. The contacts 18a and 18b close because the flux of the contactor 18 reaches zero due to the fact that the windings 18w and 18p are in opposition during reverse operation. This also causes the contact 18c to open preventing further energization of the winding 18p by the generated current of the motor and increasing the voltage across the winding 16p. The contacts 16a and 16b remain open due to the energized condition of the winding 16p. The motor is now connected for dynamic braking as indicated in Fig. 5 with the armature current flowing from terminals 10a to 10b and the field current flowing from terminals 11a to 11b.

A control system in accordance with this invention for graduating or controlling in steps the dynamic braking action just described is illustrated in Fig. 6 in which the motor is shown connected in a dynamic braking loop with the resistor 20 which may be the loop of either Fig. 3 or Fig. 5. A section 20a of the resistor 20 is arranged to be by-passed by a normally closed main contact 31a of an electromagnetic contactor 31, and a section 20b of the resistor 20 is arranged to be by-passed by a normally closed main contact 32a of an electromagnetic contactor 32. A third series-connected section 20c of the resistor 20 may also be provided. The contactor 32 preferably has an intermittent duty operating winding 32w connected across the armature 10 through a protective resistor 34. The resistor 34 is arranged to be by-passed by a circuit including a normally closed contact 35a of a relay 35 connected in series with a normally open contact 31b of the contactor 31. The relay 35 has an operating winding 35w connected directly across the armature 10. An operating winding 31w of the contactor 31 is arranged for energization from the power lines 21 and 22, and is controlled by a braking master switch 36 having stationary contact segments 36a, 36b, and 36c and a relatively movable contact segment 36d. First, second, and third positions of the master switch 36 are provided as indicated by the vertical broken lines 1, 2, and 3, respectively. The segment 36a of the master switch 36 may be connected to the supply conductor 21 through a circuit including the normally open control contact 24a or through a parallel circuit including a normally closed control contact 39a of a relay 39 and an off point of a speed controlling master switch 40 having a plurality of contacts 40a through 40g movable with respect to a plurality of segments 40q through 40z (Fig. 7). The master switch 40 may be arranged to provide three forward and three reverse speed positions as shown in Fig. 7.

While the motor is at rest as well as during drifting, acceleration, and normal running of the motor in either the forward or reverse direction, the contact 24a is closed so long as power is available. With the braking master 36 in the first position, a circuit is completed for the winding 31w and the contact 31a is open and the contact 31b is closed. The pick-up voltage of the contactor 32 is below that of the relay 35 so that, during acceleration, the winding 32w is subjected at first to substantially the full counter-E. M. F. of the armature 10 through a circuit including the contacts 35a and 31b. When the motor accelerates to a predetermined low speed, the contactor 32 picks up and opens its contact 32a. A further increase in speed of the motor causes pick-up of the relay 35 due to the operative energization of its winding 35w resulting from the increased generated voltage of the armature 10. Pick-up of the relay 35 opens the contact 35a to interrupt the by-pass circuit around the resistor 34. The drop-out voltage of the contactor 32 with the resistor 34 effectively in series with the winding 32w is below the pick-up voltage of the relay 35 so that the contactor 32 remains in its operated position with the protective resistor 34 in series with its winding 32w.

To brake the motor by manual control, the master switch 36 may be moved to its second position which effects completion in a manner to be described of one or the other of the two dynamic braking loops shown in Fig. 3 and Fig. 5 depending upon the direction of motor rotation. If the motor is running at an appreciable speed, the contactor 32 remains in its picked-up position after the braking circuit has been established. After the motor has decelerated to a predetermined speed, the relay 35 drops out and recloses its contact 35a to complete the by-pass circuit around the resistor 34. With the resistor 34 excluded from its circuit the winding 32w is connected directly across the armature 10 and the contactor 32 does not drop out until the motor slows down to a predetermined speed near standstill, such as, for example, less than one per cent of rated motor speed. So long as the braking master switch 36 is left in the second position, all of the resistor 20 is effective in the dynamic braking circuit and a constant value of dynamic braking resistance is obtained down to substantially zero speed.

If the master switch 36 is moved from its second to its third position, the contactor 31 drops out and closes its contact 31a to short circuit the resistor section 20a. With only the resistor sections 20b and 20c effective in the dynamic braking loop, the dynamic braking torque is increased over that obtained when the master switch 36 is left in its second position. Drop-out of the contactor 31 also opens the contact 31b to prevent completion of the short circuit around the resistor 34 upon closure of the contact 35a which closes when the motor reaches a predetermined reduced speed. With the resistor 34 effectively connected in series with the winding 32w, the contactor 32 drops out at a motor speed of about forty per cent instead of less than one per cent as before. Drop-out of the contactor 32 causes closure of the contact 32a which by-passes the resistor section 20b leaving only the section 20c effective in the dynamic braking loop and increased braking torque is developed at slow speeds.

With the motor running in either direction and the master switch 36 in the first position, a failure of power causes the proper braking circuit to be completed as described above. The failure of power also causes closure of the contact 31a due to deenergization of the winding 31w regardless of the position of the master switch 36 and braking proceeds automatically as when the master 36 is moved to the third position with power still available. During the interval between the opening of the contactors 12 or 14 and the build up of dynamic braking current after closure of the selected dynamic braking contactor 16 or 18, the voltage across the armature 10 decreases to a very low value before it again increases due to the dynamic braking action. Even though the resistor 34 may be effectively connected in series with the winding 32w at this time, the contactor 32 does not drop out during the short period of reduced voltage drop across the armature because of the closed loop circuit including the armature 10 and the winding 32w.

Thus for normal braking operations it is possible for the operator to select strong or weak braking torque as desired merely by adjustment of the master 36. If strong braking is selected, the dynamic braking resistance is reduced automatically while the motor is still rotating at a substantial speed, whereas, if weak braking is selected, the dynamic braking resistance remains constant substantially throughout the braking cycle. In the event of power failure, strong braking only is obtained and the graduation of the braking action during deceleration proceeds automatically.

The directional braking control system of Fig. 1 and the graduated braking control system of Fig. 6 may be arranged for cooperative operation in a motor control system such as shown in Fig. 7.

Referring to Fig. 7, the forward running contactor 12 of Fig. 1 is shown as having the main contacts 12a and 12b, an operating winding 12w, and normally open control circuit contacts 12c, 12d, and 12e. The reverse running contactor 14 has the main contacts 14a and 14b, an operating winding 14w, and normally open control circuit contacts 14c, 14d, and 14e. The contacts 12c and 14c are in parallel with each other between the resistor 28 and the conductor 22 and serve to insure that the windings 16w and 18w are energized whenever the contactors 12 or 14 are picked-up. The negative line contactor 15 has the main contact 15a, an operating winding 15w, and a normally open control circuit contact 15b.

The acceleration, plugging, and speed control means 19 of Fig. 1 may be of any suitable type, and is shown in Fig. 7 as comprising a resistor 41 having a plugging section 41a and an acceleration section 41b. The plugging section 41a is arranged to be short circuited by a main contact 42a of a plugging contactor 42 having an operating winding 42w, a normally closed control circuit contact 42b, and a normally open control circuit contact 42c. A plugging relay of any suitable type may be provided to control the operation of the plugging contactor 42 in a well-known manner. For illustrative purposes only, a normally closed contact 44a of a plugging relay 44 has been shown in Fig. 7. Operating means for the relay 44 are well-known in the art and need not be described. The acceleration section 41b is arranged to be short-circuited by main contacts 45a of an electromagnetic contactor 45 having an operating winding 45w and a normally closed control circuit contact 45b. Suitable means (not shown) may be provided to select the time or speed at which the resistor section 41b is excluded from the circuit during acceleration, and additional steps of acceleration and speed control may be provided in the means 19 if desired.

The relay 24 is a low voltage protection relay having an operating winding 24w. The relay 25 is a braking control relay and has an operating winding 25w and a normally open contact 25b in addition to the normally open contact 25a shown in Fig. 1. The time delay relay 26, which is preferably of the flux decay type, has an operating winding 26w. The contact 26a of this relay is delayed in opening as mentioned in connection with Fig. 1.

The relay 30 has an operating winding 30w arranged for connection across the armature 10 and includes the normally closed contact 30a of Fig. 1 which by-passes the resistor 29. A resistor 46 connected in series with the winding 30w is normally short-circuited by a normally closed contact 39b of the relay 39 which has an operating winding 39w, a normally open contact 39c, and the normally closed contact 39a of Fig. 6. The winding 39w is connected across the armature 10 through the resistor 47 which is normally by-passed by a normally closed contact 35b of the relay 35.

A contactor 48 having a normally open main contact 48a and an operating winding 48w is provided for completing a shunt connection through a resistor 49 around the armature 10. The resistor 49 is a relatively high value and serves to provide a slight excitation for the field winding 11 while the motor is drifting or coasting. This slight excitation is required to provide a voltage during drifting for energizing the windings supplied from the motor armature.

Further understanding of the arrangement and function of the component apparatus of Figs. 1, 6, and 7 will be had from the following description of the operation of Fig. 7.

With the master switch 40 in the off position shown and the motor at rest, an energizing circuit for the winding 24w of the low voltage protective relay 24 is completed from the supply conductor 21 through the contact 39a, the segments and contacts 40b, 40r, 40q, and 40a, a conductor 51, and the winding 24w to the supply conductor 22. Upon energization of the winding 24w the contacts 24a close to connect the conductor 51 directly to the supply conductor 21 thereby to hold the contacts 24a closed and the conductor 51 energized irrespective of the position of the master switch 40.

Upon energization of the conductor 51 an energizing circuit for the winding 26w of the time delay relay 26 is completed from the conductor 51 through the normally closed contacts 16d and 18d in parallel and the winding 26w to the conductor 22. The contacts 26a close instantly upon energization of the winding 26w to by-pass the protective resistor 28 in the energizing circuit for the windings 16w and 18w. With the braking master switch 36 in the first position as shown, an energizing circuit is also completed at this time for the winding 25w of the braking control relay 25 from the conductor 51, and the segments 36a, 36d, and 36b through the winding 25w to the conductor 22.

Energization of the winding 25w causes closure of the contacts 25a which complete an energizing circuit for the windings 16w and 18w from the conductor 51 through the windings 16w and 18w, and the contacts 26a and 25a to the conductor 22. Upon energization of the windings 16w and 18w, the contacts 16a, 16b, 18a and 18b open to interrupt the dynamic braking circuits and the contacts 16d and 18d open to interrupt the energizing circuit for the winding 26w. After a short time delay, the contacts 26a open and insert the protective resistor 28 into the energizing circuit for the windings 16w and 18w.

With the braking master 36 in the first position a circuit is also completed from the conductor 51 through the segments 36a, 36d, and 36c, and the winding 31w to the conductor 22. Upon energization of its winding 31w, the contactor 31 opens its contacts 31a and closes its contacts 31b as described hereinbefore.

If it is desired to rotate the motor in the forward direction, the master switch 40 may be moved to the forward positions to complete a circuit from the now energized segment 40r to the segment 40v, the contact 40e, and the winding 15w to the conductor 22. Energization of the winding 15w causes closure of the contacts 15a to connect the motor to the supply conductor 22. A circuit is also completed in the forward positions from the energized contact 40e through the winding 48w and the contacts 45b when those contacts are closed. Energization of the winding 48w causes closure of the contacts 48a to complete the armature shunt circuit through the resistor 49. Another energizing circuit completed in the forward positions of the master switch is from the segment 40s through the contact 40c, the winding 12w and the now closed contacts 16e, 18e, and 25b to the conductor 22. The contacts 12a and 12b close upon energization of the winding 12w to connect the motor to the conductor 21 for forward rotation as indicated in Fig. 2.

If the motor is starting from rest, the plugging relay contacts 44a remain closed, and, as soon as the master 40 reaches the second forward position a circuit for the winding 42w is completed from the segment 40x and the contact 40f through the now-closed contacts 12c and 15b to the conductor 22. Energization of the winding 42w causes closure of the contacts 42a which by-pass the plugging resistor section 41a to increase the voltage applied to the motor.

Movement of the master 40 to the third forward position completes a circuit for the winding 45w through the segment 40z, the contact 40g, and the now-closed contacts 42c. Closure of the contacts 45a resulting from the energization of the winding 45w by-passes the acceleration resistor section 41b to apply full voltage to the motor, and opening of the contacts 45b effects the deenergization of the winding 48w. Upon deenergization of the winding 48w, the contact 48a opens to remove the armature shunt connection through the resistor 49. The motor now accelerates to its normal running speed.

Acceleration of the motor from rest in the reverse direction is accomplished in a similar manner except that the contactor 14 is operated instead of the contactor 12 and the segments 40t, 40u, 40w, and 40y serve to complete selectively the control circuits for the contactors 14, 15 and 48, 42, and 45.

Reference is now made to the operation, during acceleration, of the counter-E. M. F. energized relays and contactors. As the motor starts to rotate, the relay 30 is the first to pick-up. Opening of the normally-closed contact 30a of this relay causes the resistor 29 to be effectively in series with the polarizing windings 16p and 18p. The resistor 29 not only protects the windings 16p and 18p thermally, but also limits the flux of these windings to a value below the flux provided by the windings 16w and 18w to prevent dropping out of whichever one of the contactors 16 or 18 has its windings in opposition at the time. The resistor 29 affords this protection so long as the voltage across the armature is below the supply voltage. During plugging, however, the voltage across the armature rises above the supply voltage and additional means are provided to insure proper operation under this condition as hereinafter described.

Since the relay 30 picks-up at a very low voltage, it has an intermittent duty winding which requires protection against the higher values of counter-E. M. F. This protection is provided by the resistor 46 which is effectively inserted in series with the winding 30w by opening of the contact 39b. The relay 39 has a higher pick-up value than the relay 30 and picks up later during acceleration to open the contact 39b. Pick-up of the relay 39 also opens the contact 39a and closes the contact 39c. Closure of the contact 39c completes a circuit from the conductor 51 for the windings 15 and 48 which is independent of the master switch 40. Thus, upon return of the master switch 40 to its off position, the contacts 15a and 48a remain closed so long as the motor has a sufficient counter-E. M. F. to maintain the relay 39 in its picked-up position. With the contacts 15a and 48a closed and the motor otherwise disconnected from the source, there is sufficient excitation of the field winding 11 to maintain the counter-E. M. F. operated contactors and relays in their picked-up positions thus permitting the motor to drift.

Acceleration of the motor also causes pick-up of the contactor 32 and the relay 35 as described hereinbefore. Pick-up of the contactor 32 opens the contact 32a to remove the short circuit from the resistor section 20b and pick-up of the relay 35 opens the contact 35a to insert the resistor 34 in series with the winding 32w and opens the contact 35b to insert the protective resistance 47 in series with the winding 39w.

If the motor is operating in either the forward or reverse directions and the operator desires to allow the motor to coast, the master 40 is returned to the off position. This causes the contactors 12 or 14, 42 and 45 to drop out, but the contactors 15, 16, 18, 31, 32, and 48, remain in their picked-up positions. Drop out of the contactors 12 or 14 disconnects the armature 10 from the supply conductors. The windings 15w and 48w are maintained energized so long as the motor is rotating at a substantial speed by a circuit from the conductor 51 through the contacts 39c. The field winding 11 remains energized through the contacts 48a, the resistors 49 and 41, and the contacts 15a to maintain a generated voltage of low value across the armature 10.

If, at any time while the motor is rotating, it is desired to connect the motor for weak dynamic braking, the braking master 36 may be operated to the first braking position. This interrupts the circuit to the winding 25w to effect opening of the contacts 25a and 25b. Opening of the contacts 25b interrupts the circuit for the windings 12w or 14w effecting opening of the contacts 12a and 12b or 14a and 14b. Opening of the contacts 25a deenergizes the windings 16w and 18w and the contactors 16 and 18 thereafter respond in accordance with the description of Figs. 3 and 5. Further braking operation may proceed as described in connection with Fig. 6.

During plugging, the voltage across the armature 10 can increase to a value such that there would be a tendency for the winding 16p or 18p which was opposing the corresponding winding 16w or 18w at the time to overpower its corresponding winding. To prevent this, a circuit is provided for the winding 26w from the conductor 51 through the contacts 12d and 14d in parallel, the contact 42b, and the winding 26w to the conductor 22. When the master 40 is moved through the first and off positions for plugging, the contact 42b closes and completes the above described circuit through either the contact 12d or 14d. As soon as the motor reverses, the contact 42b reopens. However, the winding 26w has been energized momentarily and the contact 26a closes and remains closed for a predetermined time during plugging. Closure of the contact 26a increases the energization of the windings 16w and 18w by by-passing the resistor 28.

If braking operation is initiated by a failure of power, it is desirable that braking be continued and the motor brought to rest even though power returns during the braking interval. In order to prevent resetting of the low voltage protective relay 24 while the motor is rotating, the contacts 39a are interposed in the circuit leading to the master 40. The contacts 39a remain open during braking and prevent reenergization of the relay 24.

We claim:

1. In a controller and motor combination, a direct current motor arranged for connection to a source of power, an armature circuit including the armature winding of the motor, an electromagnetic switch having its contacts in said circuit and having a pair of windings and a magnetic circuit at least a portion of which is common to said windings, electrical connections respective to said windings for energizing said windings in opposition to each other so that the flux produced in said common portion by one of said windings is normally in excess of the amount of flux produced in said common portion by the other of said windings and said excess is normally above the drop-out flux value of said switch, one of said electrical connections connecting said one winding to a power source for the motor, the other of said electrical connections connecting said other winding in shunt relation to said armature winding, said switch being held in one position by the algebraic sum of said fluxes when said algebraic sum exceeds said drop-out value and being operative to move to another position upon reduction of the algebraic sum of said fluxes below said drop-out value, and means operatively in said one electrical connection and responsive to a failure of voltage of said source for reducing the flux of its respective winding so that the algebraic sum of said fluxes is below said predetermined amount.

2. The combination of claim 1 characterized in that means are provided for plugging said motor and in that means are provided for increasing temporarily, when said motor is plugged, the voltage applied to said one of said windings.

3. A controller comprising an electromagnetic switch having its contacts adapted to be connected in a circuit with the armature winding of a direct current motor and having a pair of windings and a magnetic circuit at least a portion of which is common to said windings, electrical connections respective to said windings, one of said electrical connections being adapted to connect its respective winding to a power source for the motor, the other of said electrical connections being adapted to connect its respective winding in shunt relation to said armature winding, said windings being adapted to be energized in opposition to each other when said electrical connections are connected to the power source for the motor and in shunt relation to the armature winding respectively so that while the motor is rotating in the direction of its torque the flux produced in said common portion by one of said windings is in excess of the amount of flux produced in said common portion by the other of said windings, and said excess is normally above the drop-out flux value of said switch so that said switch is held, when said electrical connections are so connected for producing said excess of flux, in one position by the algebraic sum of said fluxes and is operative to move to another position upon reduction of the algebraic sum of said fluxes below said drop-out flux value, and means operatively in said one electrical connection and adapted to be responsive to a failure of voltage of said source, when said one of the electrical connections is connected to said source, for reducing the flux of its respective winding so that the algebraic sum of said fluxes is below said drop-out flux value.

4. A motor and controller combination comprising a direct current motor having a series field winding, means for supplying an operating voltage to said motor, a dynamic braking circuit for said motor including said field winding, a normally-closed electromagnetic switch in said dynamic circuit for controlling the continuity thereof and having a pair of windings and a magnetic circuit at least a portion of which is common to said windings, electrical connections respective to said windings for energizing said windings in opposition to each other so that the flux produced in said common portion by one of said windings is normally in excess of the amount of flux produced in said common portion by the other of said windings and said excess is normally above a predetermined amount, the electrical connection for said other of said windings connecting said other of said windings in shunt relation to said armature winding, said switch being held in its open position by the algebraic sum of said fluxes when said algebraic sum exceeds said predetermined amount and being operative to move to its closed position upon reduction of the algebraic sum of said fluxes below said predetermined amount, and said electrical connections for said one of said windings including means rendering the amount of flux produced in said common portion by said one of said windings directly dependent upon the amount of voltage supplied to said motor.

5. In a controller for an electric motor, means for connecting the motor to a source of power for rotation in opposite directions selectively, a pair of electromagnetic switches, a first pair of windings for operating one of said switches and a second pair of windings for operating the other of said switches, electrical connections for supplying one winding of each pair of said windings with an energizing voltage dependent upon the voltage applied to the motor, said one winding of each pair of windings being operative when supplied with said energizing voltage to hold the switch associated therewith in one position, and electrical connections for supplying the other winding of each pair of windings with a voltage the magnitude of which varies with the speed of the motor and the polarity of which depends upon the direction of motor rotation, and one of said pairs of windings being in opposition for one direction of motor rotation and being additive for the other direction of motor rotation and the other pair of windings being additive for said one direction of motor rotation and in opposition for said other direction of motor rotation.

6. In a controller and motor combination, a direct current motor having an armature winding and a series field winding, means for connecting the motor to a source of power for forward and reverse operation selectively, a first normally-closed electromagnetic switch means which when closed connects the motor windings in a closed loop circuit for dynamic braking while the motor is rotating in the forward direction, a second normally-closed electromagnetic switch means which when closed connects the motor windings in a closed loop circuit for dynamic braking while the motor is rotating in the reverse direction, each of said switch means having a pair of windings and a magnetic circuit at least a portion of which is common to its pair of windings, means for connecting one winding of each pair for energization from said source of power, means connecting the other winding of each pair to the motor for energization by the generated voltage of said motor, the pair of windings associated with the first normally-closed switch means being in opposition while the motor is rotating in the forward direction and additive while the motor is rotating in the reverse direction, the pair of windings associated with the second normally-closed switch means being in opposition while the motor is operating in the reverse direction and additive while the motor is operating in the forward direction, the flux produced in the common portion of the associated magnetic circuit by said one winding of each pair being in excess of the amount of flux produced in the common portion by the respective other winding of each pair, and each of said switch means being held in a normally-open position by the algebraic sum of the flux in the common portion of the magnetic circuit thereof and being movable to its normally-closed position upon reduction of said algebraic sum below a given value.

7. A controller for a direct current motor having an armature winding and a series field winding, means adapted, when connected to said motor, to connect the motor to a source of power for forward and reverse operation selectively, a first normally-closed electromagnetic switch means adapted to connect the motor windings in a closed loop circuit for dynamic braking while the motor is rotating in the forward direction, a second normally-closed electromagnetic switch means adapted to connect the motor windings in a closed loop circuit for dynamic braking while the motor is rotating in the reverse direction, each of said switch means including a pair of windings and a magnetic circuit at least a portion of which is common to its pair of windings, means adapted to connect one winding of each pair for energization from said source of power while the motor is also connected to said source, means adapted to connect the other winding of each pair to the motor for energization by the generated voltage of said motor, the pair of windings associated with the first normally-closed switch means being in opposition while the motor is rotating in the forward direction and additive while the motor is operating in the reverse direction, the pair of windings associated with the second normally-closed switch means being in opposition while the motor is operating in the reverse direction and additive while the motor is operating in the forward direction, the flux produced in the common portion of the associated magnetic circuit by said one winding of each pair being in excess of the amount of flux produced in the common portion by the respective other winding of each pair, each of said switch means being held in a normally-open position by the algebraic sum of the fluxes in the common portion of the magnetic circuit thereof and being movable to its normally-closed position upon reduction of said algebraic sum below a given value.

8. In a controller for a direct current motor having an armature winding and a series field winding, means for selectively connecting the motor to a source of power for forward and reverse operation of the motor, a dynamic braking resistor, a plurality of normally-closed switches for connecting said resistor selectively in either of two dynamic braking loop circuits each of which includes the armature and field windings, magnetic means arranged to be supplied with an energizing voltage which varies with the voltage applied to the motor and operative for opening said normally-closed switches when voltage is applied to the motor, said magnetic means including means for preventing closure of certain of said normally-closed switches when voltage is removed from the motor, a first normally-closed magnetic switch means arranged to be energized from the source of power and operative upon failure of voltage of said source for commutating a portion of said resistor, and a second normally-closed magnetic switch means arranged to be energized by the counter voltage of said motor and operative, consequent upon a predetermined reduction of the counter voltage when some of said normally-closed switches are closed and said motor is rotating, to commutate another portion of said resistor.

9. A controller in accordance with claim 8 characterized in that said controller includes a manually operated means having two positions of movement, means operable when said manually operated means is in one of said two positions for opening said normally-open switches to remove voltage from said motor and for interrupting the supply of voltage from said source to said magnetic means while maintaining both of said magnetic switch means inoperative until said motor comes to rest, whereby certain of said normally-closed switches close to complete one of said dynamic braking circuits and whereby neither portion of said resistor is commutated, and means operable when said manually operated means is moved from said first position to said second position to permit sequential operation of said magnetic switch means before said motor comes to rest.

10. A controller for a direct current motor comprising a dynamic braking resistor, switching means for completing a dynamic braking loop circuit including said resistor and the armature winding of the motor, magnetically opened contacts connected in shunt relation with series-connected portions of said resistor, respectively, manual means operable for controlling the closure of one of said contacts, means rendered operative by rotation of the motor for controlling the closure of the other of said contacts in accordance with the motor speed while said loop circuit is completed, and means dependent upon the operative position of said one of said contacts for determining at which one of two motor speeds said means operates to effect closure of the other of said contacts.

11. A controller in accordance with claim 10 characterized in that said means rendered operative by rotation of the motor comprises an operating winding for the other of said contacts and in that said means dependent upon the operative position of said one of said contacts includes a resistor connected in series with said winding.

12. In a controller and motor combination, a direct current motor having an armature winding and a series field winding, reversing switching means connected to said motor for energizing said motor from a source of power for forward and reverse operation selectively, circuits adapted to be completed to form dynamic braking loops with the motor windings, brake switch means for completing the said circuits, said brake switch means including a pair of electromagnetic switches each operative in response to the algebraic sum of a pair of fluxes in its magnetic circuit, said brake switch means having cooperating flux-producing portions causing the direction of one of the fluxes in each of said switches to be independent of the direction of motor rotation and the direction of the other one of the fluxes in each of said switches to be dependent upon the direction of motor rotation, and means connecting said cooperating portions to said motor and to said source so that the fluxes in one of said switches are opposed for one direction of motor rotation and are additive for the other direction of motor rotation, whereas the fluxes in the other of said switches are additive for said other direction of motor rotation and substractive for said one direction of motor rotation.

13. In a controller for a direct current motor having an armature winding and a series field winding, reversing switching means for connecting said motor to a source of power for forward and reverse operation selectively, circuits adapted to be completed to form dynamic braking loops with the motor windings, brake switch means for completing the said circuits, said brake switch means including a pair of electromagnetic switches each operative in response to the algebraic sum of a pair of fluxes in its magnetic circuit, said brake switch means having cooperating flux-producing portions causing the direction of one of the fluxes in each of said switches to be independent of the direction of motor rotation and the direction of the other one of the fluxes in each of said switches to be dependent upon the direction of motor rotation, and means for connecting said cooperating portions to said motor and to said source so that the fluxes in one of said switches are opposed for one direction of motor rotation and are additive for the other direction of motor rotation, whereas the fluxes in the other of said switches are additive for said other direction of motor rotation and subtractive for said one direction of motor rotation.

14. A motor and controller combination comprising a direct current motor having an armature winding and a series field winding, reversing switching means connected to said motor and operable to complete circuits from a source of power through said motor for causing said motor to operate in forward and reverse directions selectively, a pair of normally-closed electromagnetic switches completing when closed respective dynamic braking loop circuits for said motor each including said motor windings, each of said switches having a pair of windings and a magnetic circuit at least a portion of which is common to its pair of windings, electrical connections for supplying one winding of each pair of windings with an energizing voltage directly related in magnitude to the voltage supplied to said motor, electrical connections for supplying the other winding of each pair of windings with a voltage the polarity of which is dependent upon the direction of motor rotation, one of said pairs of windings being in opposition for one direction of motor rotation and being additive for the other direction of motor rotation and the other pair of said windings being additive for said one direction of motor rotation and in opposition for said other direction of motor rotation, said one winding of each pair of windings producing in said common portion of its associated magnetic circuit a flux in excess of the flux produced therein by said other winding of each pair of windings so long as the voltage applied to said motor is above a predetermined value, each of said switches being held in an open position by the algebraic sum of said fluxes in the common portion of its magnetic circuit and being operative to move to the normally-closed position upon reduction of the algebraic sum of said fluxes in the common portion of its magnetic circuit below said predetermined amount.

15. In a dynamic braking controller for a direct current motor having an armature and a series field winding, means for connecting said motor to a source of voltage for forward and reverse operation selectively, a dynamic braking resistor, an electromagnetic switch having normally-closed contacts connected to said resistor and arranged when closed to connect said resistor in a loop circuit with said armature and field windings and having a pair of operating windings and a magnetic circuit at least a portion of which is common to said operating windings, connections for one of said operating windings arranged to connect said one operating winding to a source of voltage of fixed polarity the continuity of which is dependent upon the continuity of the voltage supplied to the motor, connections for the other of said operating windings arranged to connect said other operating winding to a source of voltage the polarity of which is dependent upon the direction of rotation of the motor and the magnitude of which is directly dependent upon the speed of the motor, whereby said operating windings when connected to their respective voltage sources are additive or in opposition depending upon the direction of rotation of said motor, said operating windings being so related to each other that the flux produced in said magnetic circuit by said one operating winding is greater than the flux produced in said magnetic circuit by said other operating winding when the motor is at its maximum speed, whereby an excess of flux equal to the algebraic sum of said fluxes is produced in said common portion of said magnetic circuit when said windings are energized in opposition, said related operating windings being also so related to said switch that said excess of flux is above the drop-out flux value of said switch, whereby said switch is held in open position by said excess of flux and is operative to move to its closed position upon reduction of the algebraic sum of said fluxes below said drop-out flux value, and means for discontinuing the supply of voltage to said motor and to said one winding concurrently, whereby the algebraic sum of said fluxes in said common portion becomes zero before it increases at opposite polarity due to continued energization of said other winding.

16. A controller comprising the following fixed combination of controller elements both connected together and related in characteristics to each other so that the fixed combination of the elements can be connected to a direct current motor having an armature winding and a series field winding to provide the following combination: a direct current motor having an armature winding and a series field winding, means for connecting the motor to a source of power for forward and reverse operation selectively, a first normally-closed electromagnetic switch means which when closed connects the motor windings in a closed loop circuit for dynamic braking while the motor is rotating in the forward direction, a second normally-closed electromagnetic switch means which when closed connects the motor windings in a closed loop circuit for dynamic braking while the motor is rotating in the reverse direction, each of said switch means having a pair of windings and a magnetic circuit at least a portion of which is common to its pair of windings, means for connecting one winding of each pair for energization from said source of power, means connecting the other winding of each pair to the motor for energization by the generated voltage of said motor, the pair of windings associated with the first normally-closed switch means being in opposition while the motor is rotating in the forward direction and additive while the motor is rotating in the reverse direction, the pair of windings associated with the second normally-closed switch means being in opposition while the motor is operating in the reverse direction and additive while the motor is operating in the forward direction, the flux produced in the common portion of the associated magnetic circuit by said one winding of each pair being in excess of the amount of flux produced in the common portion by the respective other winding of each pair, and each of said switch means being held in a normally-open position by the algebraic sum of the flux in the common portion of the magnetic circuit thereof and being movable to its normally-closed position upon reduction of said algebraic sum below a given value.

17. In a controller and direct current motor combination in which the armature winding of the motor is connected while rotating into a loop circuit with a dynamic braking resistor, a pair of normally-closed contacts operative when closed to shunt respective serially connected portions of said resistor, magnetic means respective to said contacts and operative when energized to hold said contacts open, control means operative to maintain both of said magnetic means energized at the instant of completion of said loop circuit, said control means including manual means operable at all times to disable one of said magnetic means while maintaining the other magnetic means energized thereby to permit the closing of only one of said contacts, and said magnetic means which maintains the other of said contacts open including a winding connected to said motor so as to be energized by the counter-voltage of the motor and be responsive to the speed of the motor for maintaining said other contact open until said motor reaches a predetermined speed.

18. A controller in accordance with claim 7 characterized in that means associated with the other winding of each pair of windings is responsive to the speed of the motor for reducing the voltage applied to said other windings after a predetermined increased speed has been reached by the motor.

19. A controller in accordance with claim 7 characterized in that the other winding of each pair of windings are connected in parallel with each other and in series with a common resistor, normally-open contact means associated with the first switch means are connected in series with the other winding of the first switch means and in parallel with the other winding of the second switch means, and normally-open contact means associated with the second switch means are connected in series with the other winding of the second switch means and in parallel with the other winding of the first switch means.

20. A controller in accordance with claim 10 characterized in that said means for controlling the closure of the other of said contacts comprises a magnet winding arranged to be connected across the armature of said motor through a resistor arranged to be by-passed by auxiliary contacts which are closed when said one of said contacts is open and which are open when said one of said contacts are closed.

JOHN D. LEITCH.
PAUL G. WHITE.

REFERENCES CITED

The following references are of record in the file of this patent:

UNITED STATES PATENTS

| Number | Name | Date |
|---|---|---|
| 1,400,077 | Keith | Dec. 13, 1921 |
| 1,455,668 | Scheer | May 15, 1923 |
| 1,497,780 | Gazda | June 17, 1924 |
| 1,805,248 | King | May 12, 1931 |
| 1,839,559 | Jenks | Jan. 5, 1932 |